US 9,148,765 B2

(12) United States Patent
Grinshpun et al.

(10) Patent No.: US 9,148,765 B2
(45) Date of Patent: Sep. 29, 2015

(54) PUSH SERVICE WITHOUT PERSISTENT TCP CONNECTION IN A MOBILE NETWORK

(71) Applicants: Alcatel-Lucent USA Inc., Murray Hill, NJ (US); Alcatel-Lucent Canada Inc., Ottawa (CA)

(72) Inventors: Edward Grinshpun, Freehold, NJ (US); Colin Kahn, Morris Plains, NJ (US); Mira Vrbaski, Kanata (CA); Sankaranarayanan Sathyanarayan, Stewartsville, NJ (US); Mark A. Smith, Jersey City, NJ (US)

(73) Assignee: Alcatel Lucent, Boulogne-Billiancourt (FR)

( * ) Notice: Subject to any disclaimer, the term of this patent is extended or adjusted under 35 U.S.C. 154(b) by 184 days.

(21) Appl. No.: 13/686,659

(22) Filed: Nov. 27, 2012

(65) Prior Publication Data

US 2014/0148205 A1 May 29, 2014

(51) Int. Cl.
*H04W 4/00* (2009.01)
*H04W 4/12* (2009.01)
*H04L 29/06* (2006.01)
(Continued)

(52) U.S. Cl.
CPC .............. *H04W 4/12* (2013.01); *H04L 63/029* (2013.01); *H04L 67/146* (2013.01); *H04L 67/26* (2013.01); *H04L 67/28* (2013.01); *H04L 69/16* (2013.01); *H04W 68/00* (2013.01); *H04L 67/2809* (2013.01)

(58) Field of Classification Search
CPC ... H04L 67/26; H04L 12/1859; H04L 63/029; H04L 67/146; H04L 69/16; H04L 67/28; H04L 67/2809; H04W 4/12; H04W 8/18; H04W 4/20; H04W 68/00
USPC ........................................................ 455/466
See application file for complete search history.

(56) References Cited

U.S. PATENT DOCUMENTS

| 2002/0138622 A1 | 9/2002 | Dorenbosch et al. |
| 2006/0218287 A1 | 9/2006 | Dodrill et al. |

(Continued)

OTHER PUBLICATIONS

International Search Report issued on Feb. 17, 2014, for the corresponding International Patent Application No. PCT/US13/69105, 4 pgs.

(Continued)

*Primary Examiner* — Nathan Mitchell
(74) *Attorney, Agent, or Firm* — Chiesa Shahinian & Giantomasi PC (57) ABSTRACT

Methods, systems, and articles of manufacture for non-TCP push service in a mobile network comprise receiving, at a push server, registration information for a mobile device from a push client via a first internal interface without persistent TCP connection. The registration information includes a private IP address for the mobile device and a mobile device session identifier associated with an instance of an application client on the mobile device. A push trigger associated with an event of an application server is received at the push server via a second interface exposed outside of a service provider firewall. The push trigger includes a push trigger session identifier. When the push trigger session identifier matches the mobile device session identifier, the push trigger is determined to be associated with the instance of the application client on the mobile device and is transmitted to the push client without persistent TCP connection.

23 Claims, 4 Drawing Sheets

(51) Int. Cl.
*H04L 29/08* (2006.01)
*H04W 68/00* (2009.01)

(56) References Cited

U.S. PATENT DOCUMENTS

2009/0158397 A1* 6/2009 Herzog et al. .................. 726/4
2010/0124191 A1* 5/2010 Vos et al. ..................... 370/328
2010/0138501 A1* 6/2010 Clinton et al. ................ 709/206
2010/0195576 A1* 8/2010 Kong et al. .................. 370/328
2010/0313078 A1* 12/2010 Burckart et al. .............. 714/48
2012/0259987 A1* 10/2012 Burckart et al. .............. 709/227
2012/0270579 A1* 10/2012 Seo et al. ..................... 455/466
2013/0188560 A1* 7/2013 Kiss et al. .................... 370/328
2014/0066063 A1* 3/2014 Park ........................... 455/435.1
2014/0194097 A1* 7/2014 Gaddam et al. ............... 455/411

OTHER PUBLICATIONS

International Written Opinion issued on Feb. 17, 2014, for the corresponding International Patent Application No. PCT/US13/69105, 4 pgs.

* cited by examiner

PUSH SERVICE WITHOUT PERSISTENT TCP CONNECTION IN A MOBILE NETWORK

FIELD OF THE INVENTION

The present disclosure relates generally to mobile networks and more particularly to mobile network push services.

BACKGROUND

Mobile device applications typically operate in a client-server model, where the application client on a mobile device receives and processes data from one or more network-based application servers. To obtain the data from the server, the application client may use either a pull or push mode. In the pull mode, the application client periodically polls the application server for new data. In the push mode, the application server "pushes" data to the application client when the new data is available, without the need for the application client to poll.

Applications that often poll the network can benefit from push services. Push services include traditional e-mail (e.g., for sending a push notification to a mobile device when new e-mail arrives at the server), Short Messaging Service (SMS) (e.g., for sending a push notification when an SMS message arrives at a server), voice over internet protocol (VoIP) (e.g., for notification of an incoming call), web browsing (e.g., for notification of when to refresh the web page), and growing video applications for 3G/4G smart mobile devices. Examples of push event notifications for such video applications include, but are not limited to, network condition changes, policy changes, and other notifications that may require an application client response.

Push mode is especially important for mobile devices operating over cellular networks. Typically, when a mobile device does not have data to send or receive, it can go into an idle (e.g., dormant, sleep) mode to conserve battery power and over-the-air resources associated with the device's radio operation. The radio access network maintains location state information of the idle device and uses paging mechanisms defined by a corresponding cellular access technology standard to wake up the mobile device when data arrives for the device.

In contrast, pull mode requires a mobile device to periodically exit idle mode when the application client needs to poll the application server for new data, regardless of whether the server has such new data or not, resulting in waste of mobile device battery resources and unnecessary over the air communications. Further, improving application response time requires increasing polling frequency with more battery and over the air resources wasted. Reducing polling frequency can result in more delays in application client responses to application server events.

With 3G and 4G networks using all IP-based data services, the typical network architecture for current cellular service providers uses private IP addresses for the mobile devices, with a firewall between the service provider core network and the public internet. This presents a significant challenge for push implementations. A typical firewall with network address translation (NAT) located between the application client on the mobile device (with a private IP address) and the application server allows only for transmission control protocol (TCP) based client-initiated communications between the application client and application server. However, maintaining such TCP connections between the application client and application server requires periodic "heart-beating", which is essentially equivalent to a pull mode (client-originated TCP packets have to be exchanged periodically), with a similar impact as pull mode on the mobile device idle mode.

With an application client that has a private IP address behind a firewall, an application server located outside the firewall cannot send IP packets to the application client without a special "hole" in the firewall, since the client's private IP address is not reachable from the outside of the service provider's network. Such a "hole in the firewall" is typically created automatically when a TCP connection with the application server is originated by the application client. The firewall NAT function replaces in the client sent TCP/IP packet, the pair <source IP address, source TCP port number> with the pair of <public IP address common for many clients+unique new source TCP port number> and creates for a certain duration of time a mapping between the pair <source IP address, source TCP port number>, and the <unique new source TCP port number>, thus allowing packets from the application server addressed to the <public IP address common for many clients+unique new source TCP port number> to be forwarded to the <source IP address, source TCP port number> of the application client. Such mapping creates a "hole" in the firewall allowing the application server to send packets to the application client. In the absence of TCP traffic (e.g., when the client goes to idle mode), the mapping ages out and the client becomes unreachable from the server. However, maintaining a persistent TCP connection by sending periodic TCP traffic to refresh this mapping is costly and requires the mobile device to periodically exit the idle state to generate such traffic. Also, the "aging" timers configuration may vary for different firewalls, resulting in a requirement for such traffic to be unnecessarily frequent.

Existing solutions indicate the importance of firewall issues, but also that there is no single satisfactory approach for a push implementation with a firewall between a service provider network and the public internet.

For example, a TCP-based mobile operating system (OS) or mobile device vendor push service typically consists of a push server located elsewhere in the internet (outside of the wireless service providers firewall-protected core), push client middleware coupled with the mobile device OS, and a set of APIs specific to the mobile device OS that are exposed to the application clients and servers to register and receive push service. However, a persistent TCP connection has to be maintained through the firewall. Maintaining such a connection requires periodic TCP traffic to be exchanged between the mobile device and the push server, resulting in a waste of both battery life and over-the-air resources. Depending upon the frequency of the TCP keep-alive (in some cases it is every second) and/or firewall aging refresh exchanges, the mobile device is either completely prevented from entering the idle mode (if the keep-alive exchange is too frequent) or is forced to periodically exit the idle mode for the keep-alive exchange. The frequency of the TCP exchange is typically dictated by OS-specific considerations (e.g., TCP keep-alive or other mechanisms that allow a server to detect a dead TCP connection when the mobile device powers down or abruptly goes out of wireless coverage range) as well as by a firewall hole aging timer for the reverse TCP traffic from the server to the client. Also, maintaining persistent TCP connections with tens of millions of mobile clients requires significant server resources to be allocated. In addition, this method may create privacy issues for the mobile device users, as it may allow the third-party push server to track mobile devices and their use of applications.

Figure 1:
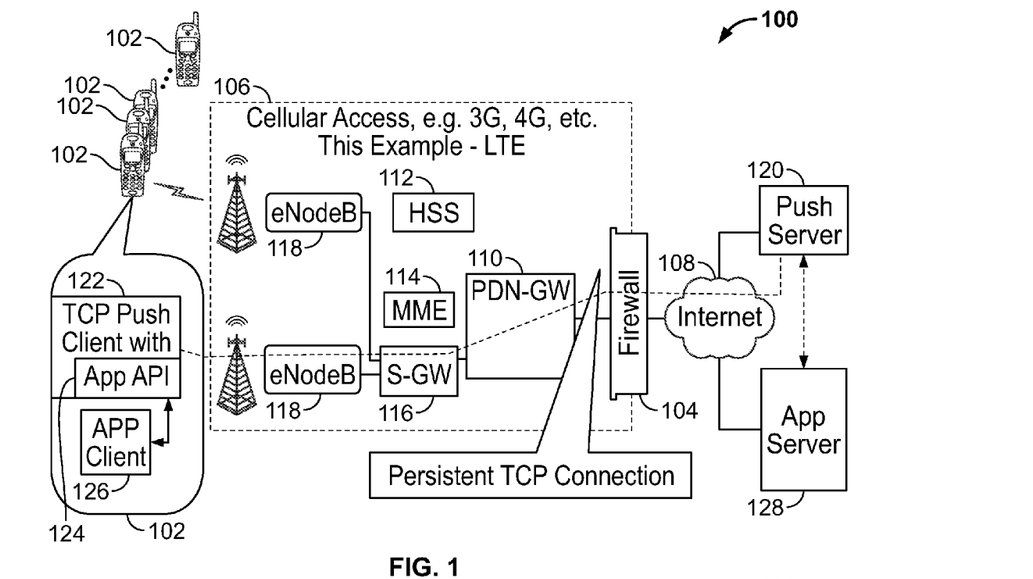
FIG. 1 illustrates a functional diagram of a mobile network for implementing a persistent TCP connection-based vendor-controlled push service.

FIG. 1 illustrates a functional diagram of a mobile network for implementing a persistent TCP connection-based vendor-controlled push service. The network 100 generally provides mobile network services (e.g., voice, text, video and other data services) through the use of private IP addresses for one or more mobile devices 102. Mobile devices 102 are configured to run a mobile device operating system (OS) and various mobile network service applications utilizing customized, vendor-implemented push services. The network 100 includes a firewall 104 with network address translation (NAT) between a mobile service provider's core network 106 and the public Internet 108. Core network 106 includes components typically used for implementing an LTE mobile communications system such as a packet data network gateway (PDN-GW) 110, home subscriber server (HSS) 112, mobility management entity (MME) 114, serving gateway (S-GW) 116, and one or more eNodeB cellular access points 118. However, core network 106 may be a 2G, 3G (e.g., WCDMA-UMTS, CDMA) or 4G (e.g., LTE, WiMAX) network with components configured to implement any such standards-defined network architecture. Therefore, while FIG. 1 illustrates an LTE mobile communications system, one skilled in the art will recognize that one or more of these components, and various other well-known components, may be added or combined for implementing a 2G, 3G, 4G or other mobile communications system network architecture.

Network 100 can further include a push server 120 accessible via the public Internet 108 outside of firewall 104. Mobile devices 102 can include push client 122 (e.g., middleware coupled with the mobile device Operating System (OS)), and one or more application programming interfaces (APIs) 124 that are exposed to application client 126 and application server 128 for registering and receiving push services specific to mobile device/OS vendors via a persistent TCP-based connection. For example, a mobile device 102 may periodically "wake up" to send a heartbeat-type communication to maintain a TCP-based connection.

In network 100, application server 128 cannot send IP packets to a mobile device 102 that has a private IP address without a special "hole" in the firewall (i.e., the client's private IP address is not reachable from outside of the service provider's core network 106). For example, such a "hole" in firewall 104 may be created automatically when a TCP-based connection with application server 128 is originated by a mobile device 102. Specifically, a firewall NAT function replaces a private address/port number pair, for example <source IP address, source TCP port number>, with a public address/port number pair, for example <public IP address common for many mobile devices+unique new source TCP port number>, in a TCP/IP packet sent by a mobile device 102, and creates (e.g., for a certain duration of time) a mapping between the pair, <source IP address, source TCP port number>, and the unique new source TCP port number. As such, application server 128 may send packets addressed to the <public IP address common for many clients+unique new source TCP port number> that may be forwarded to the private address/port number pair, <source IP address, source TCP port number>, of a specific mobile device 102. This mapping procedure, defined as creating a "hole" in the firewall, allows application server 128 to send packets to application client 126. However, in the absence of TCP-based communication traffic (e.g., when a mobile device 102 toggles into idle mode) the public/private mapping may expire, meaning that application client 126 will become unreachable from application server 128.

A User Datagram Protocol-based Session Initiation Protocol (UDP-based SIP) model requires a special session border controller device to operate in conjunction with a firewall to dynamically "punch" holes in the firewall to reach a mobile device during mobile device registration on the network. This method allows a mobile device to receive incoming calls. However, a UDP-based SIP model may also require a specialized session border control function for each new application and a reconfiguring of the session border controller each time a new application appears on the market.

SMS messages also may be utilized for push notifications for non-SMS instant message applications. However, many service provider plans charge users for receiving SMS messages. Therefore, using SMS for push notifications may cause unexpected and unwelcome charges for users with such plans.

SUMMARY

Methods, systems, and articles of manufacture for a push service in a wireless service provider core network that is compatible with idle (e.g., sleep or dormant) mode requirements of devices receiving service on 2G/3G/4G mobility networks is disclosed. In one embodiment, a push server includes two interfaces. A first interface is within a service provider's private network behind the firewall, so that a mobile device is reachable from the push server using a private IP address of the mobile device. A second interface is public (i.e., exposed outside the service provider's firewall) such that application servers located outside of a firewall can initiate push triggers.

This architecture eliminates the need for a permanent TCP connection between a push server and a mobile device. For example, an interface between a push server and a push client within a mobile device can support a connection-less (e.g., UDP) protocol with some added acknowledgement messages for reliability or a non-persistent TCP connection, initiated by the push server for delivering a single push notification.

In the absence of new data on an application server, a mobile device can go into an idle (e.g., sleep or dormant) mode to conserve battery power, and a cellular access network corresponding to the mobile device can maintain a network-specific (i.e., native) location update mechanism, such that when packets from a push server need to be transmitted to a mobile device in idle state, the location update mechanism can wake-up the mobile device and allow it to receive a push trigger from the push server.

In one embodiment, a method comprises receiving, at a push server, registration information for a mobile device from a push client via a first internal interface without persistent TCP connection. The registration information includes a private IP address for the mobile device and a mobile device session identifier associated with an instance of an application client on the mobile device. Later a push trigger associated with an event of an application server is received at the push server via a second interface exposed outside of a service provider firewall, wherein the push trigger includes a push trigger session identifier. The push trigger is determined to be associated with the instance of the application client on the mobile device when the push trigger session identifier matches the mobile device session identifier and, when the push trigger session identifier matches the mobile device session identifier, the push trigger is transmitted by the push server to the push client on the mobile device. The push trigger may be transmitted to the push client via one of an internal first interface (if the mobile device is connected via a cellular 2G-3G-4G interface) or an external second interface (if the mobile device is connected via a Wi-Fi interface), and the push trigger over the internal first interface may be transmitted using UDP or non-persistent TCP. A TCP connection with the push client may be originated by the push server to deliver the push trigger and then terminated after the push trigger is delivered.

In accordance with an embodiment, the session identifier is transmitted from the application client to the application server via an application specific client-server communication. The communication may be based upon TCP.

In accordance with an embodiment, after the session identifier is transmitted to the application server, the mobile device is set to an idle state. The mobile device is set to a non-idle state when a paging message associated with the push trigger is received at the push client.

In accordance with an embodiment, the push trigger is received at the push client and communicated to the application client, using the session identifier in the push trigger to identify the application client instance.

In accordance with an embodiment, the push trigger is received at the application client and an application specific TCP-based connection is established between the application client and the application server to receive data associated with the push trigger.

In accordance with an embodiment, the registration information is transmitted when the mobile device moves from a first access network to a second access network if the private IP address or the session identifier changes between the first and second access networks.

These and other advantages will be apparent to those of ordinary skill in the art by reference to the following detailed description and the accompanying drawings.

DETAILED DESCRIPTION

Many current mobile networks (e.g., 3G/4G/LTE) are using transmission control protocol (TCP)/Internet Protocol (IP) based data services, which are used to provide various vendor-controlled push services. When an application client resides behind a firewall, such as in a service provider network, applications that must often poll a network server for new data can benefit from a non-TCP way of establishing a push service, as disclosed herein. Examples of such applications include traditional e-mail (push notification is sent to the mobile device when new e-mail arrives at the server), SMS (push notification is sent when an SMS arrives at the server), VoIP (push notification for an incoming call), web browsing (push notification for when to refresh the web page), and a growing number of video applications for 3G/4G smart mobile devices. Examples of push event notifications for such video applications include but are not limited to network condition changes, policy changes, and other notifications that might require a robust application client response.

Figure 2:
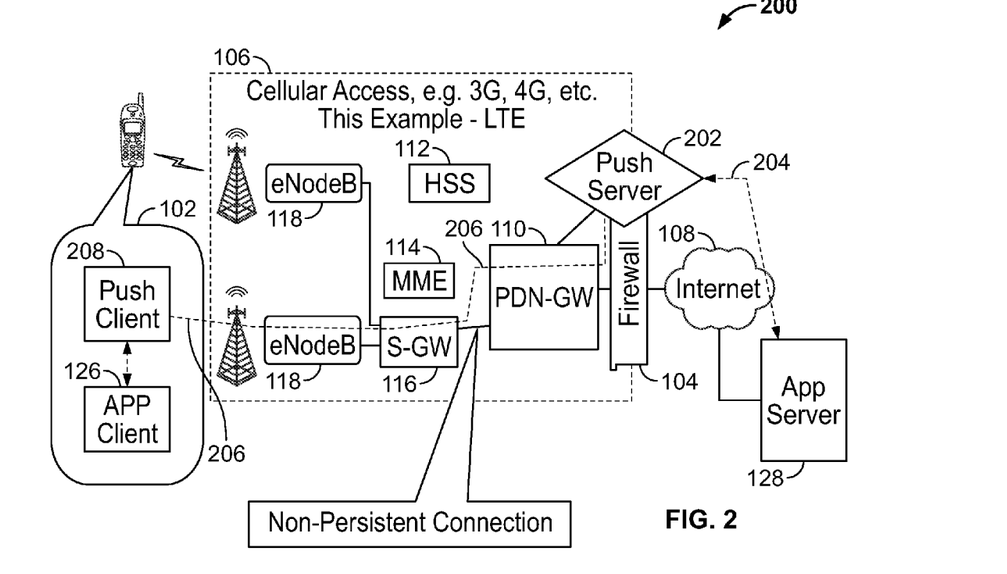
FIG. 2 illustrates a functional diagram of a mobile network for implementing a push service without persistent TCP connection in accordance with an embodiment.

Various embodiments provided herein detail a push service without persistent TCP connection in a wireless service provider's core network. FIG. 2 illustrates a functional diagram of a mobile network 200 for implementing a push service without persistent TCP connection in accordance with an embodiment. The push service illustrated in FIG. 2 is compatible with idle mode requirements of mobile devices 102 receiving service on 2G/3G/4G or other mobility networks. For example, non-TCP push server 202 has two communication interfaces. The first interface 204 is public, i.e., exposed outside the service provider's firewall, so that application server 128 outside of firewall 104 can initiate a push trigger (i.e., a notification of an application server event). The second internal interface 206 is within the service provider's private network 106 behind firewall 104, so that a mobile device 102 is reachable from non-TCP push server 202 using the private IP address of mobile device 102.

This architecture eliminates the need for a persistent TCP-based connection between a push server and a mobile device 102. For example, the interface between non-TCP push server 202 and non-TCP push client 208 in the mobile device 102 can be based upon UDP or another non-persistent connection. One skilled in the art will recognize that that, in one embodiment, a UDP-based non-persistent connection may include acknowledgement messages for reliability. Further, any of a variety of communication protocols for push services without persistent TCP connection may be used for communications between non-TCP push client 208 and non-TCP push server 202. As used herein, the term non-TCP refers to connections or communications not using TCP (e.g., UDP-based connections or communications) and also non-persistent TCP connections or communications where, for example, a TCP connection is established to transmit a single message and then is terminated.

In the absence of the new data on application server 128, a mobile device 102 can toggle into an idle mode to conserve battery power. For example, mobile access network 106 may maintain a corresponding wireless access technology-defined (i.e., native) location update mechanism for locating mobile devices. As such, when the packets from non-TCP push server 202 need to be transmitted to a mobile device 102 in idle state, a native paging mechanism may wake up the mobile device 102 and allow it to receive the push trigger from non-TCP push server 202.

Figure 3:
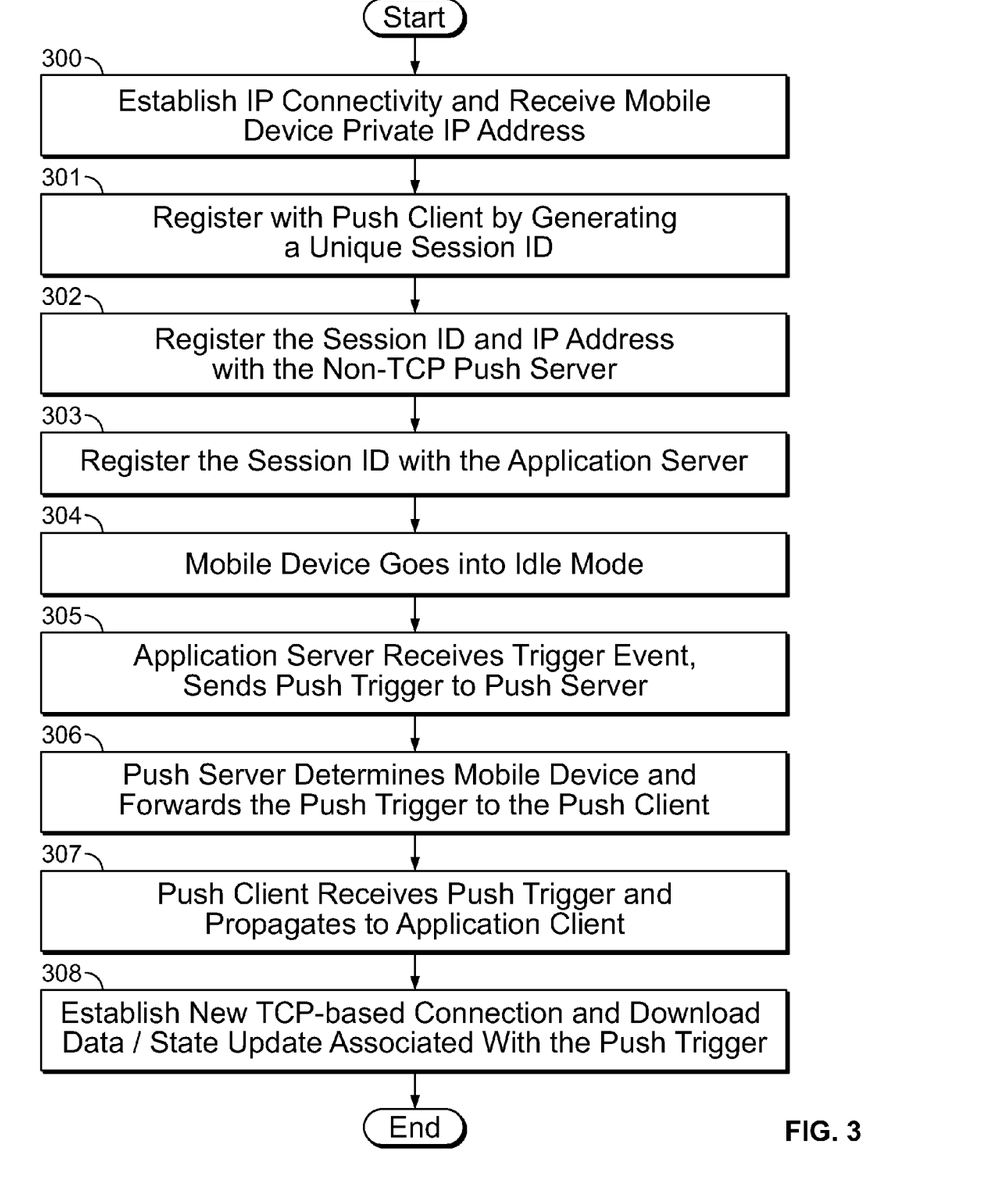
FIG. 3 illustrates a push service implementation flowchart in accordance with an embodiment.

FIG. 3 illustrates a push service implementation flowchart in accordance with an embodiment. At step 300, IP connectivity via a wireless service provider network is established, and mobile device 102 receives a private IP address. At step 301, upon a session initiation by application client 126, application client 126 registers with non-TCP push client 208 on the mobile device 102 for the push service by generating a unique session identifier (ID). One skilled in the art will recognize that the session ID may be generated by any number of different ID generating algorithms for the purposes herein. The session ID is used to (a) allow non-TCP push server 202 to identify the mobile device 102 to propagate a push trigger, and (b) to allow non-TCP push client 208, after receiving a push trigger from non-TCP push server 202, to identify the corresponding application client instance on the mobile device 102 and propagate the incoming push trigger to a particular application client 126.

At step 302, the push client 208 registers the session ID (from step 301) and the IP address (from step 300) with non-TCP push server 202 using, for example, a UDP-based connection with acknowledgements for reliability. Alternatively, a non-persistent TCP connection may be established for a single operation (e.g. registration of the session ID or sending an individual message) and then terminated after the operation is completed.

At step 303, application client 126 (e.g., using a native application for TCP-based communications with application server 128 in the network) establishes an application session and registers the session ID with application server 128, so application server 128 can transmit a push trigger when necessary.

When the application session is done, the TCP-based connection between application client 126 and application server 128 is terminated, and the mobile device 102 toggles into an idle mode to conserve battery power at step 304. In one embodiment, the mobile device 102 can preserve the same IP address that was received in step 300 in an idle mode. The mobile network 106 may then use a location update function to maintain mobile device location information. Alternatively, if a mobile device IP address change is required (e.g., due to mobility event between networks), various 3G and 4G networking standards (3GPP, 3GPP2, WiMAX) will require a mobile device to toggle out of an idle mode and become active to retransmit a newly assigned IP address.

At step 305, application server 128 in the network 200 receives a trigger event, or new data requiring an update of mobile device data or state information. The trigger event can be any kind of event (e.g., a new e-mail is received for e-mail application; the contents of the application server database were updated and application client 126 is subscribed for receiving automatic updates; the network has become uncongested and a large video file can be downloaded or uploaded by the application; application server 128 receives a policy update that needs to be propagated to application client 126 with an impact on an ongoing video session, etc.). Application server 128 sends a push trigger to non-TCP push server's 202 public IP address, exposed outside of the service provider firewall 104, including the session ID that application server 128 received in step 303. One skilled in the art will recognize that application server 128 may obtain the IP address of non-TCP push server 202 by any means (e.g., the IP address may be a well-known or published IP address). Alternatively, the IP address of non-TCP push server 202 may be received by application server 128 with the session ID in step 303.

At step 306, non-TCP push server 202, using the mapping between the session ID and the mobile device IP address assigned in step 300 to determine the mobile device 102 associated with the push trigger, transmits the push trigger to non-TCP push client 208 on the mobile device 102 using UDP-based messages (e.g., with acknowledgement). For example, if the mobile device 102 is in an idle state, a regular paging mechanism may be invoked by the mobile access network 106 to wake up the mobile device 102 upon detecting the push trigger addressed to the mobile device 102. Further, if the initial packet is lost, non-TCP push server 202 may retransmit the push trigger to the mobile device 102.

At step 307, non-TCP push client 208 on the mobile device 102 receives the push trigger, and using the session ID generated in step 301 communicates the push trigger to application client 126. For example, non-TCP push client 208 may identify an application client instance using the session ID in the push trigger and forward the push trigger to application client 126.

At step 308, application client 126, upon receiving the push trigger, establishes a new TCP-based connection with application server 128 and downloads data (i.e., the trigger event) associated with the push trigger.

Figure 4:
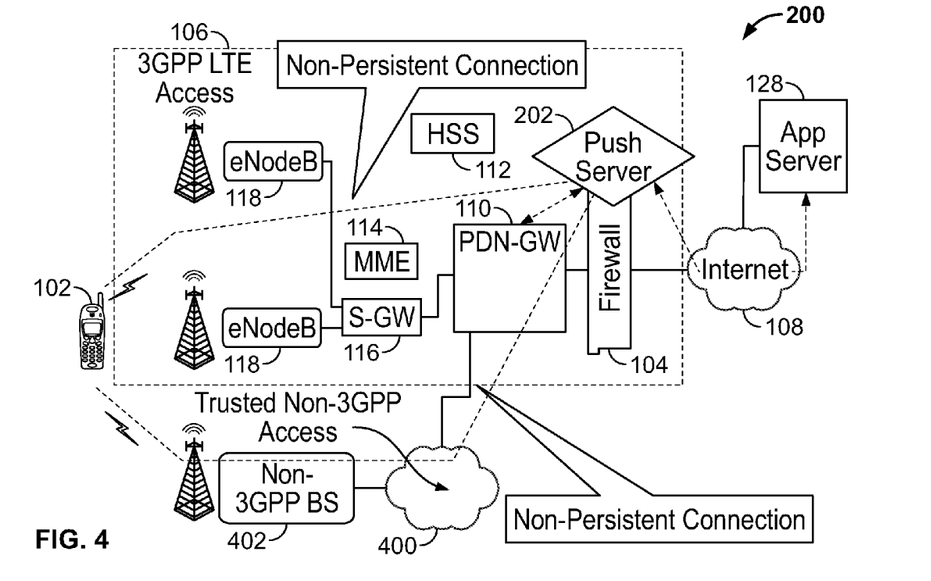
FIG. 4 illustrates a functional diagram of a mobile network for implementing an alternative push service without persistent TCP connection in accordance with an embodiment.

In another embodiment, the push service of FIG. 2 is applicable in case of standards defined multi-access interworking of the trusted 3G/4G mobile networks. FIG. 4 illustrates a functional diagram of a mobile network for implementing an alternative push service without persistent TCP connection in accordance with an embodiment. In FIG. 4, a 3G/4G network 106 is shown to be interworking with a trusted non-3GPP access network 400 having one or more non-3GPP base stations 402. For the purposes of the embodiment, interworking is defined as in the 3GPP standard (i.e., using common PDN GW 110 as an IP anchor). The same mechanism described in FIG. 3 above can be utilized for the push service without persistent TCP connection in FIG. 4, with the PDN GW 110 anchoring IP access to the mobile device 102. In one embodiment, push client-push server re-registration may occur every time the mobile device 102 IP address changes or a new session ID is generated (e.g., when application client 126 restarts or new instance of an application client is started).

Figure 5:
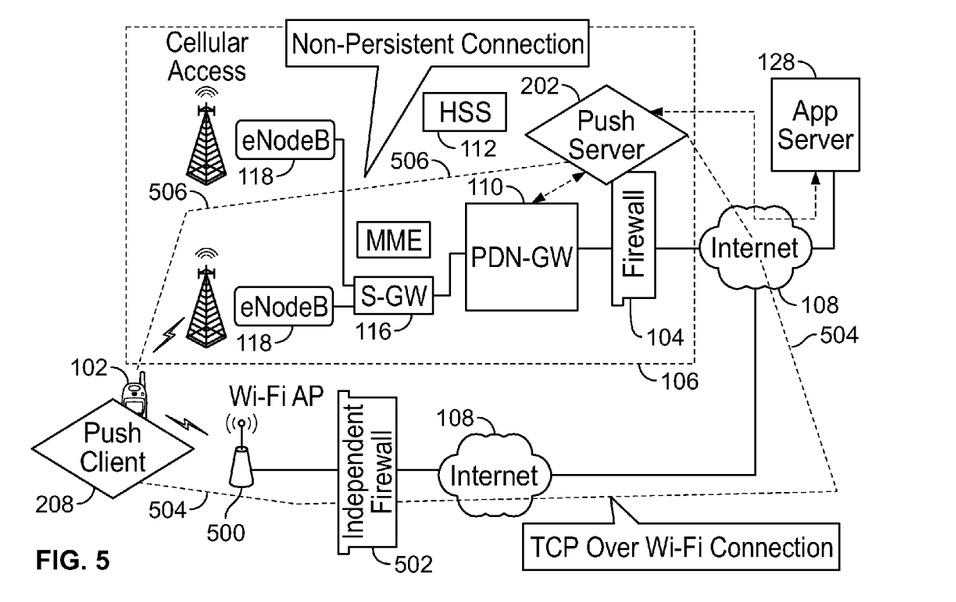
FIG. 5 illustrates a functional diagram of a mobile network for implementing another alternative push service without persistent TCP connection in accordance with an embodiment.

FIG. 5 illustrates a functional diagram of a mobile network for implementing another alternative push service without persistent TCP connection in accordance with an embodiment. In FIG. 5, the push service supports Wi-Fi access with local breakout. Specifically, the PDN GW 110 does not anchor the IP session over a Wi-Fi access point 500. Rather, when an IP session is established over the Wi-Fi access point 500 (there is typically an independent firewall 502 for Wi-Fi access), push client 208 establishes and maintains a persistent TCP-based connection 504 over Wi-Fi with push server 202, using the externally available public IP address of push server 202. As a result, when the mobile device 102 is connected via the mobile network, a push trigger may be propagated via the non-TCP connection 506, allowing full benefits of the idle mode when on the mobile network 106. When the mobile device 102 is connected via a Wi-Fi access point 500, a persistent TCP-based connection 504 is maintained. Since there is no idle mode for Wi-Fi access, such a persistent TCP-based connection 504 over Wi-Fi does not have significant negative impact.

The various embodiments provide a unique way for network operators to reduce signaling load associated with setting up connections. Currently these connections are configured to either poll servers for data (pull model), or to send periodic heartbeats to maintain persistent TCP-based connections (competing push model). Eliminating both of these by using the UDP-based or non-persistent TCP-based connections proposed in herein reduces the required operator investment needed to support a given level of network traffic.

In addition, this approach addresses other general issues for TCP-based push services. In various embodiments, having a push service hosted by a wireless service provider helps to alleviate the privacy issue of third-party enterprises gaining access to tracking information for mobile device customers. While tracking information is necessary for implementing the various embodiments, wireless service providers track the mobile devices as part of an understood service contract with customers to provide mobile services. Also, using a non-TCP (e.g., UDP-based) connection between non-TCP push server 202 and non-TCP push client 208 resolves push server scalability issues with regard to data traffic capacity, since UDP is a connection-less, non-persistent protocol.

The embodiments also benefit subscribers by extending mobile battery life, since mobile devices 102 will no longer need to be configured for unnecessary connections to network servers, such as for heart beating or polling purposes. Further, the embodiments provide services providers with an opportunity to host mobile vendor-independent push services. This has particular appeal to application providers because they no longer have to implement mobile device vendor or operating system-specific mechanisms for sending content to mobile devices.

Figure 6:
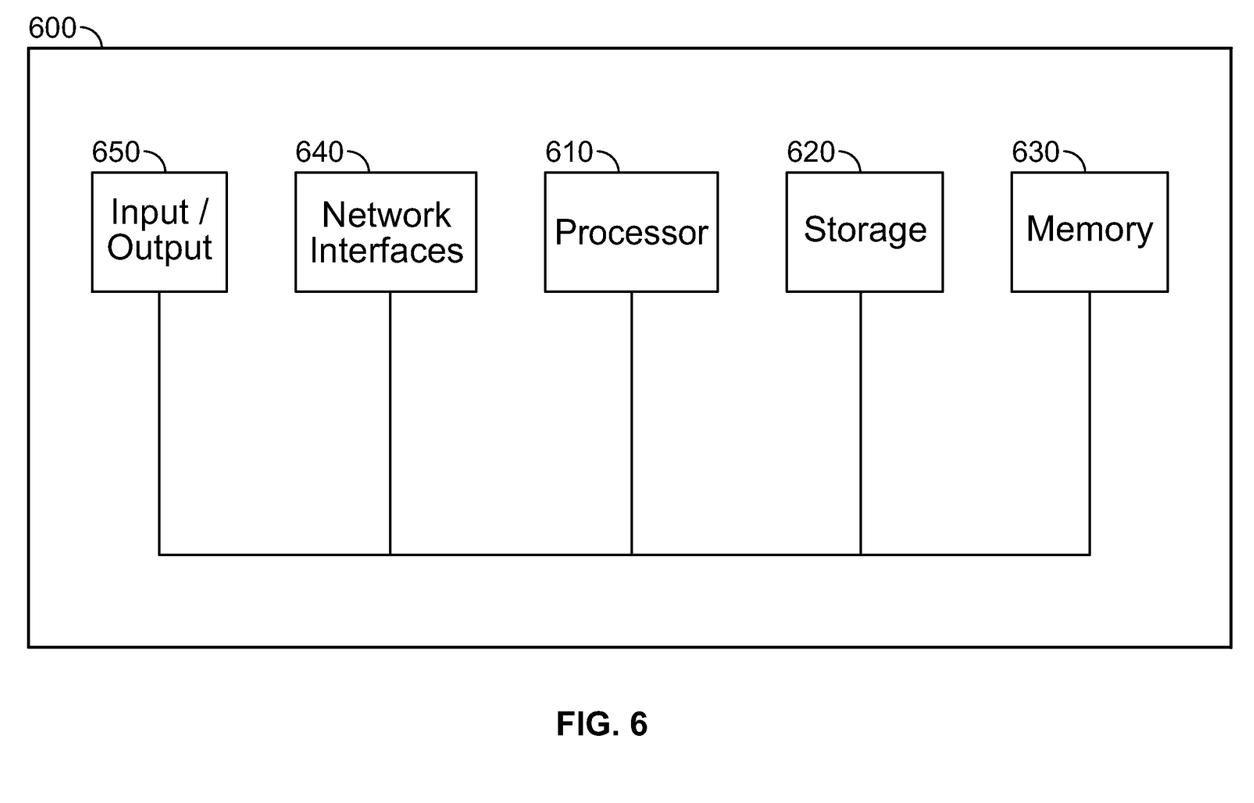
FIG. 6 illustrates a high-level block diagram of an exemplary computer that may be used for implementing a push service without persistent TCP connection.

The above-described method steps, including those steps described as being implemented by a mobile device or a server, may be implemented on a computer using well-known computer processors, memory units, storage devices, computer software, and other components. FIG. 6 is a high-level block diagram of an exemplary computer that may be used for implementing a push service without persistent TCP connection. Computer 600 contains a processor 610, which controls the overall operation of the computer 600 by executing computer program instructions which define such operation. The computer program instructions may be stored in a storage device 620 (e.g., magnetic disk) and loaded into memory 630 when execution of the computer program instructions is desired. Thus, the steps of the method of FIG. 3 may be defined by the computer program instructions stored in the memory 630 and/or storage 620 and controlled by the processor 610 executing the computer program instructions. The computer 600 may include one or more network interfaces 640 for communicating with other devices via a network for implementing the steps of the method of FIG. 3. The computer 600 may also include other input/output devices 650 that enable user interaction with the computer 600 (e.g., display, keyboard, mouse, speakers, buttons, etc.). One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by applicable patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method comprising:
receiving, at a push server, registration information for a mobile device from a push client via a first internal interface without persistent Transmission Control Protocol (TCP) connection, the registration information including a private Internet Protocol (IP) address for the mobile device and a mobile device session identifier associated with an instance of an application client on the mobile device;
receiving, at the push server, a push trigger associated with an event of an application server via a second interface exposed outside of a service provider firewall, wherein the push trigger includes a push trigger session identifier identifying the instance of the application client on the mobile device;
determining that the push trigger is associated with the instance of the application client on the mobile device when the push trigger session identifier matches the mobile device session identifier; and
transmitting the push trigger to the instance of the application client on the mobile device by mapping the push trigger session identifier to the private IP address of the mobile device.

2. The method of claim 1, wherein the push trigger is transmitted to the push client via one of the first internal interface without persistent TCP connection or over a cellular network.

3. The method of claim 1, wherein a connection between the push server and the push client via the first internal interface is a User Datagram Protocol (UDP)-based connection.

4. The method of claim 1, wherein a connection between the push server and the push client via the first internal interface is a non-persistent TCP connection.

5. The method of claim 1, further comprising:
transmitting the mobile device session identifier from the application client to the application server via an interface supporting an application specific TCP connection.

6. The method of claim 5, wherein the mobile device is set to an idle state after the mobile device session identifier is transmitted to the application server and there is no application data to transmit.

7. The method of claim 5, wherein the mobile device is set to a non-idle state when a paging message associated with the push trigger is received at the push client.

8. The method of claim 1, further comprising:
receiving the push trigger at the push client; and
communicating the push trigger to the application client.

9. The method of claim 7, further comprising:
receiving the push trigger at the application client; and
establishing an application specific TCP-based connection between the application client and the application server to receive data associated with the push trigger.

10. The method of claim 1, further comprising transmitting, from the push server, the registration information when the mobile device moves from a first access network to a second access network if the private IP address or the session identifier changes between the first and second access networks.

11. The method of claim 1, wherein a TCP connection via the internal first interface with the push client is originated by the push server to deliver the push trigger and then terminated after the push trigger is delivered.

12. An apparatus comprising:
a push server for:
receiving registration information for a mobile device from a push client via a first internal interface without persistent TCP connection, the registration information including a private IP address for the mobile device and a mobile device session identifier associated with an instance of an application client on the mobile device; and
receiving a push trigger associated with an event of an application server via a second interface exposed outside of a service provider firewall, wherein the push trigger includes a push trigger session identifier identifying the instance of the application client on the mobile device;
a data storage device storing computer program instructions; and
a processor communicatively coupled to the data storage device, the processor configured to execute the computer program instructions, which, when executed on the processor, cause the processor to perform a method comprising:
determining that the push trigger is associated with the instance of the application client on the mobile device when the push trigger session identifier matches the mobile device session identifier; and transmitting the push trigger to the instance of the application client on the mobile device by mapping the push trigger session identifier to the private IP address of the mobile device.

13. The apparatus of claim 12, wherein the method further comprises transmitting the push trigger to the push client via one of the first internal interface without a persistent TCP connection or over a cellular network.

14. The apparatus of claim 12, wherein a connection between the push server and the push client via the first internal interface is a UDP-based connection.

15. The apparatus of claim 12, wherein a connection between the push server and the push client via the first internal interface is a non-persistent TCP connection.

16. The apparatus of claim 12, wherein the method further comprises transmitting the mobile device session identifier from the application client to the application server via an interface supporting an application specific TCP connection.

17. The apparatus of claim 16, wherein the mobile device is set to an idle state after the mobile device session identifier is transmitted to the application server and there is no application data to transmit.

18. The apparatus of claim 17, wherein the mobile device is set to a non-idle state when a paging message associated with the push trigger is received at the push client.

19. The apparatus of claim 12, wherein the method further comprises communicating the push trigger to the application client when the push trigger is received at the push client.

20. The apparatus of claim 19, wherein the method further comprises establishing an application specific TCP-based connection between the application client and the application server to receive data associated with the push trigger when the push trigger is received at the application client.

21. The apparatus of claim 12, wherein the method further comprises transmitting, from the push server, the registration information when the mobile device moves from a first access network to a second access network if the private IP address or the session identifier changes between the first and second access networks.

22. The apparatus of claim 12, wherein a TCP connection via the internal first interface with the push client is originated by the push server to deliver the push trigger and then terminated after the push trigger is delivered.

23. A non-transitory computer-readable medium having computer program instructions stored thereon, which, when executed on a processor, cause the processor to perform a method comprising:

receiving, at a push server, registration information for a mobile device from a push client via a first internal interface without persistent TCP connection, the registration information including a private IP address for the mobile device and a mobile device session identifier associated with an instance of an application client on the mobile device;

receiving, at the push server, a push trigger associated with an event of an application server via a second interface exposed outside of a service provider firewall, wherein the push trigger includes a push trigger session identifier identifying the instance of the application client on the mobile device;

determining that the push trigger is associated with the instance of the application client on the mobile device when the push trigger session identifier matches the mobile device session identifier; and transmitting the push trigger to the instance of the application client on the mobile device by mapping the push trigger session identifier to the private IP address of the mobile device.

* * * * *